United States Patent
Hirayama

(10) Patent No.: US 9,616,718 B2
(45) Date of Patent: Apr. 11, 2017

(54) PNEUMATIC TIRE

(71) Applicant: SUMITOMO RUBBER INDUSTRIES, LTD., Kobe-shi, Hyogo (JP)

(72) Inventor: Michio Hirayama, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 503 days.

(21) Appl. No.: 14/239,518

(22) PCT Filed: Oct. 12, 2012

(86) PCT No.: PCT/JP2012/076393
§ 371 (c)(1),
(2) Date: Feb. 18, 2014

(87) PCT Pub. No.: WO2013/054865
PCT Pub. Date: Apr. 18, 2013

(65) Prior Publication Data
US 2014/0196822 A1    Jul. 17, 2014

(30) Foreign Application Priority Data
Oct. 14, 2011  (JP) .................. 2011-226386

(51) Int. Cl.
*B60C 19/00*  (2006.01)
*B60C 19/08*  (2006.01)
(Continued)

(52) U.S. Cl.
CPC .......... *B60C 19/082* (2013.04); *B60C 1/0008* (2013.04); *B60C 1/0016* (2013.04);
(Continued)

(58) Field of Classification Search
CPC ................................................ B60C 19/082
(Continued)

(56) References Cited

U.S. PATENT DOCUMENTS

| 6,269,854 B1 | 8/2001 | Matsuo et al. |
| 2006/0042733 A1 | 3/2006 | Matsui |

(Continued)

FOREIGN PATENT DOCUMENTS

| EP | 1 659 005 A1 | 5/2006 |
| EP | 2 233 323 A1 | 9/2010 |

(Continued)

*Primary Examiner* — Timothy Kennedy
(74) *Attorney, Agent, or Firm* — Birch, Stewart, Kolasch & Birch, LLP

(57) ABSTRACT

[Object] To provide a pneumatic tire 2 from which static electricity is easily discharged.
[Solution] The tire 2 includes penetration portions 8, an under tread 6, a belt 16, a carcass 16, and clinches 12. The carcass 16 includes a large number of cords aligned with each other, and a conductive topping rubber. The electric resistance Rc of the carcass which is represented by the following mathematical formula is less than $1.0 \times 10^8 \Omega$.

$Rc = \rho/g/(2 \times 3.14 \times r) \times L \times 10$

In the mathematical formula, $\rho$ is the volume resistivity ($\Omega \cdot cm$) of the topping rubber of the carcass, g is the minimum thickness (mm) of the topping rubber, r is the distance (m) from the axis of the tire to an outer end, in the radial direction, of the clinch, and L is the length (m) of the carcass from an end of the reinforcing layer to the outer end, in the radial direction, of the clinch.

7 Claims, 5 Drawing Sheets

(51) Int. Cl.
*B60C 5/14* (2006.01)
*B60C 1/00* (2006.01)
*B60C 11/00* (2006.01)
*B60C 13/02* (2006.01)
*B60C 15/06* (2006.01)

(52) U.S. Cl.
CPC .............. *B60C 5/14* (2013.01); *B60C 11/005* (2013.01); *B60C 13/02* (2013.01); *B60C 19/084* (2013.04); *B60C 19/088* (2013.04); *B60C 2001/005* (2013.04); *B60C 2015/0614* (2013.04)

(58) Field of Classification Search
USPC ..................................................... 152/152.1
See application file for complete search history.

(56) References Cited

U.S. PATENT DOCUMENTS

| | | |
|---|---|---|
| 2006/0102264 A1 | 5/2006 | Nicolas |
| 2007/0044884 A1 | 3/2007 | Nishitani |
| 2007/0246142 A1 | 10/2007 | Ishiyama et al. |
| 2012/0048435 A1 | 3/2012 | Kuroki |

FOREIGN PATENT DOCUMENTS

| | | |
|---|---|---|
| JP | 7-82420 A | 3/1995 |
| JP | 9-266280 A | 10/1997 |
| JP | 2006-69341 A | 3/2006 |
| JP | 2007-55363 A | 3/2007 |
| JP | 2009-154608 A | 7/2009 |
| JP | 2010-222004 A | 10/2010 |
| JP | 2010-264920 A | 11/2010 |
| JP | 2011-126338 A | 6/2011 |
| WO | WO 2005/115769 A1 | 12/2005 |

PNEUMATIC TIRE

TECHNICAL FIELD

The present invention relates to pneumatic tires. Specifically, the present invention relates to pneumatic tires of which a tread and sidewalls are non-conductive.

BACKGROUND ART

A reinforcing agent for sidewalk and treads of tires is generally carbon black. Carbon black is a conductive substance. Sidewalls and treads including carbon black are excellent in conductivity. Static electricity generated at a vehicle is discharged to a road surface via a rim, sidewalls, and a tread.

Instead of carbon black or together with carbon black, silica may be blended in a tread. By blending silica, a tire having reduced roiling resistance can be obtained. Silica is a non-conductive substance. A tire of which a tread includes silica is poor in conductivity. A vehicle on which the tire is mounted is easily charged with static electricity. The static electricity causes radio noise. In addition, the static electricity provides a feeling of discomfort to a driver by sparks.

JP9-266280 (JP No. 3364511) discloses a tire including a terminal portion. The terminal portion is formed integrally with an under tread. The terminal portion penetrates through a tread and is exposed on a tread surface. Static electricity is discharged to a road surface via a rim, sidewalls, the under tread, and the terminal portion.

CITATION LIST

Patent Literature

Patent Literature 1: JP9-266280

SUMMARY OF THE INVENTION

Problems to be Solved by the Invention

In recent years, there has been a growing tendency of giving consideration to the environment, and tires are desired to have further low fuel consumption performance. For the purpose of achieving further low fuel consumption performance, silica may be blended in sidewalls. By blending silica, a tire having reduced rolling resistance can be obtained. However, the volume resistivity of each sidewall including silica is high. Even when the tire includes an under tread and a terminal portion, electric conduction between a rim and the under tread is blocked. The electric resistance of the tire is high. A vehicle on which the tire is mounted is easily charged with static electricity.

An object of the present invention is to provide a pneumatic tire from which static electricity is easily discharged.

Solution to the Problems

A pneumatic tire according to the present invention includes:

(1) a non-conductive tread having an outer surface which forms a tread surface;

(2) a conductive under tread located inward of the tread in a radial direction;

(3) a conductive penetration portion penetrating through the tread, exposed at an end thereof on the tread surface, and extending at another end thereof to the under tread;

(4) a pair of non-conductive sidewalls extending from ends, respectively, of the tread substantially inward in the radial direction;

(5) a pair of conductive clinches extending from ends of the sidewalls, respectively, substantially inward in the radial direction;

(6) a pair of beads located inward of the clinches, respectively, in an axial direction;

(7) a carcass extending along and inward of the tread and the sidewalls and on and between one of the beads and the other bead; and (8) a conductive reinforcing layer laminated on the carcass at an inner side, in the radial direction, of the under tread.

The carcass includes a large number of cords aligned with each other, and a conductive topping rubber. An electric resistance Rc of the carcass which is represented by the following mathematical formula is less than $1.0 \times 10^8 \Omega$.

$$Rc = \rho/g/(2 \times 3.14 \times r) \times L \times 10$$

In the mathematical formula, $\rho$ is a volume resistivity ($\Omega \cdot cm$) of the topping rubber of the carcass, g is a minimum thickness (mm) of the topping rubber, r is a distance (m) from an axis of the tire to an outer end, in the radial direction, of the clinch, and L is a length (m) of the carcass from an end of the reinforcing layer to the outer end, in the radial direction, of the clinch.

Preferably, an electric resistance Rt of the tire which is measured according to a JATMA standard is less than $1.0 \times 10^8 \Omega$.

Preferably, the minimum thickness g of the topping rubber of the carcass is equal to or greater than 0.07 mm. The topping rubber of the carcass is formed by crosslinking a rubber composition. Preferably, the rubber composition includes 100 parts by weight of a base rubber and 35 parts by weight or greater of carbon black. Preferably, the volume resistivity of the topping rubber of the carcass is less than $1.0 \times 10^8 \Omega \cdot cm$.

Each sidewall is formed by crosslinking a rubber composition. Preferably, the rubber composition includes 100 parts by weight of a base rubber and 35 parts by weight or greater of silica.

The tire may include an inner liner located inward of the carcass. The inner liner is formed by crosslinking a rubber composition. Preferably, the rubber composition includes 100 parts by weight of a base rubber and 35 parts by weight or greater of silica.

The tire may further include an insulation located between the carcass and the inner liner. The insulation is formed by crosslinking a rubber composition. Preferably, the rubber composition includes 100 parts by weight of a base rubber and 35 parts by weight or greater of silica.

According to another aspect, a pneumatic tire according to the present invention includes:

(1) a non-conductive tread having an outer surface which forms a tread surface;

(2) a conductive under tread located inward of the tread in a radial direction;

(3) a conductive penetration portion penetrating through the tread, exposed at an end thereof on the tread surface, and extending at another end thereof to the under tread;

(4) a pair of non-conductive sidewalls extending from ends, respectively, of the tread substantially inward in the radial direction;

(5) a pair of conductive clinches extending from ends of the sidewalls, respectively, substantially inward in the radial direction;

(6) a pair of beads located inward of the clinches, respectively, in an axial direction;

(7) a carcass extending along and inward of the tread and the sidewalls and on and between one of the beads and the other bead; and (8) a conductive reinforcing layer laminated on the carcass at an inner side, in the radial direction, of the under tread.

The carcass includes a large number of cords aligned with each other, and a conductive topping rubber. An electric resistance Rt of the tire which is measured according to a JATMA standard is less than $1.0 \times 10^8 \Omega$.

Advantageous Effects of the Invention

In the pneumatic tire according to the present invention, static electricity is discharged via the clinches, the carcass, the reinforcing layer, the under tread, and the penetration portion. In a vehicle on which the tire is mounted, radio noise is suppressed. In the vehicle including the tire, sparks are also suppressed.

DESCRIPTION OF EMBODIMENTS

The following will describe in detail the present invention based on preferred embodiments with appropriate reference to the drawings.

Figure 1:
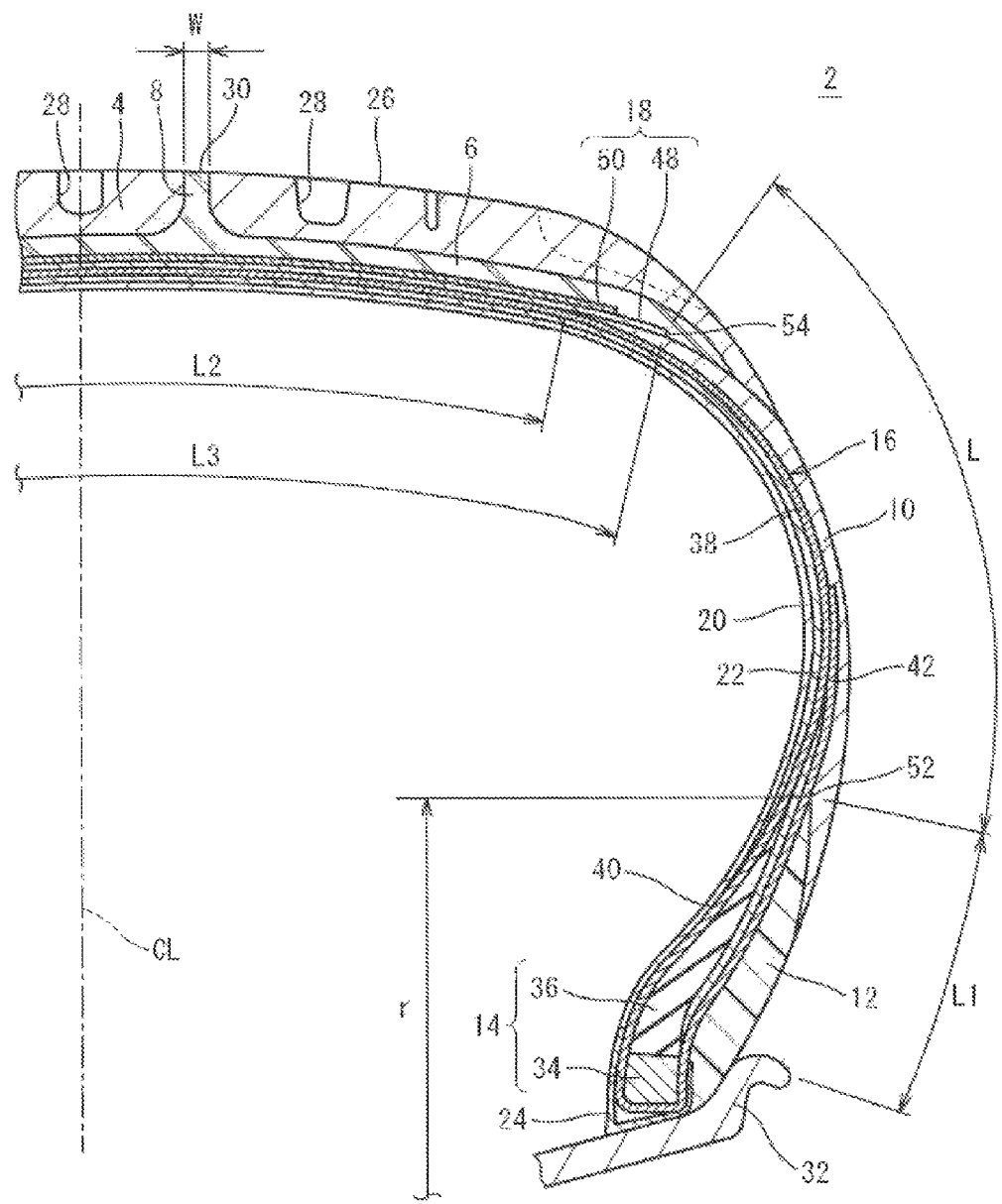
FIG. 1 is a cross-sectional view showing a portion of a pneumatic tire according to one embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane except for a tread pattern.

The tire 2 includes a tread 4, an under tread 6, penetration portions 8, sidewalls 10, clinches 12, beads 14, a carcass 16, a belt 18, an inner liner 20, an insulation 22, and chafers 24. The tire 2 is of a tubeless type. The tire 2 is mounted on a passenger car.

The tread 4 has a shape projecting outward in the radial direction. The tread 4 forms a tread surface 26 which is brought into contact with a road surface. Grooves 28 are formed on the tread surface 26. The tread pattern is formed by the grooves 28. The tread 4 is non-conductive. In the present invention, the term "non-conductive" means that the volume resistivity of the component is equal to or greater than $1.0 \times 10^8 \Omega \cdot cm$. Particularly, the volume resistivity of the non-conductive component is equal to or greater than $1.0 \times 10^{10} \Omega \cdot cm$.

The tread 4 is formed by crosslinking a rubber composition. A preferable base rubber of the rubber composition is a diene rubber. Specific examples of the diene rubber include natural rubber (NR), polyisoprenes (IR), polybutadiene (BR), acrylonitrile-butadiene copolymer (IBR), and polychloroprene (CR). The diene rubber includes a copolymer of a conjugated diene monomer and an aromatic vinyl monomer. Specific examples of the copolymer include solution-polymerized styrene-butadiene copolymer (S-SBR) and emulsion-polymerized styrene-butadiene copolymer (E-SBR). A polymer which is particularly suitable for the tread 4 is solution-polymerized styrene-butadiene copolymer.

The rubber composition of the tread 4 includes silica as a main reinforcing agent. The rolling resistance of the tire 2 including the tread 4 is low. The silica contributes to low fuel consumption performance of the tire 2. In light of low fuel consumption performance and strength of the tread 4, the amount of the silica per 100 parts by weight of the base rubber is preferably equal to or greater than 40 parts by weight, more preferably equal to or greater than 50 parts by weight, and particularly preferably equal to or greater than 60 parts by weight. The amount is preferably equal to or less than 100 parts by weight.

The rubber composition of the tread 4 can include dry silica, wet silica, synthesized silicate silica, and colloidal silica. The nitrogen adsorption specific surface area (BET) of the silica is preferably equal to or greater than 150 $m^2/g$ and particularly preferably equal to or greater than 173 $m^2/g$. The nitrogen adsorption specific surface area of easily available silica is equal to or less than 250 $m^2/g$.

The rubber composition of the tread 4 includes a silane coupling agent together with the silica. It is inferred that the coupling agent achieves firm bonding between the rubber molecules and the silica. It is inferred that the coupling agent achieves firm bonding between silica and other silica.

The rubber composition of the tread 4 may include a small amount of carbon black as another reinforcing agent. The carbon black contributes to wear resistance of the tread. The small amount of the carbon black does not significantly impair low fuel consumption performance which is due to the silica. The amount of the carbon black per 100 parts by weight of the base rubber is preferably equal to or less than 20 parts by weight, more preferably equal to or less than 10 parts by weight, and particularly preferably equal to or less than 5 parts by weight.

The rubber composition of the tread 4 includes sulfur and a vulcanization accelerator. The rubber composition may include a softener, a plasticizer, an antioxidant, stearic acid, zinc oxide, and the like.

The under tread 6 is located inward of the tread 4 in the radial direction. The under tread 6 is joined to the tread 4. The under tread 6 is conductive. In the present invention, the term "conductive" means that the volume resistivity of the component is less than $1.0 \times 10^8 \Omega \cdot cm$. Particularly, the volume resistivity of the conductive component is equal to or less than $1.0 \times 10^7 \Omega \cdot cm$.

The under tread 6 is formed by crosslinking a rubber composition. A preferable base rubber of the rubber composition is a diene rubber. The diene rubbers described above for the tread 4 can also be used for the under tread 6. A polymer which is particularly suitable for the under tread 6 is solution-polymerized styrene-butadiene copolymer.

The rubber composition of the under tread 6 includes carbon black as a main reinforcing agent. The carbon black is a conductive substance. Since the rubber composition includes the carbon black as a main reinforcing agent, the under tread 6 is achieved to be conductive. In light of conductivity, the amount of the carbon black per 100 parts by weight of the base rubber is preferably equal to or greater than 45 parts by weight, more preferably equal to or greater than 55 parts by weight, and particularly preferably equal to or greater than 65 parts by weight. The amount is preferably equal to or less than 100 parts by weight.

The rubber composition of the under tread 6 can include channel black, furnace black, acetylene black, and thermal black. The oil absorption of the carbon black is preferably equal to or greater than 5 $cm^3/100$ g and preferably equal to or less than 300 $cm^3/100$ g.

The rubber composition of the under tread 6 includes sulfur and a vulcanization accelerator. The rubber composition may include a softener, a plasticizer, an antioxidant, stearic acid, zinc oxide, and the like.

Each penetration portion 8 penetrates through the tread 4. An end 30 of the penetration portion 8 is exposed on the tread surface 26. The penetration portion 8 extends to the under tread 6. The penetration portion 8 extends in the circumferential direction. In other words, the penetration portion 8 is annular. The tire 2 may include a plurality of penetration portions which are spaced apart from each other in the circumferential direction instead of an annular penetration portion.

Each penetration portion 8 is formed by crosslinking a rubber composition. In the present embodiment, each penetration portion 8 is integrated with the under tread 6. The rubber composition of the penetration portion 8 is the same as the rubber composition of the under tread 6. The penetration portion 8 is conductive similarly to the under tread 6.

The sidewalls 10 extend from ends of the tread 4 substantially inward in the radial direction. Outer ends, in the radial direction, of the sidewalls 10 are joined to the tread 4. Inner ends, in the radial direction, of the sidewalls 10 are joined to the clinches 12. The sidewalls 10 prevent damage of the carcass 16. The sidewalls 10 are non-conductive.

Each sidewall 10 is formed by crosslinking a rubber composition. A preferable base rubber of the rubber composition is a diene rubber. The diene rubbers described above for the tread 4 can also be used for each sidewall 10. In light of cut resistance and weather resistance, polymers which are particularly suitable for each sidewall 10 are natural rubber and polybutadiene.

The rubber composition of each sidewall 10 includes silica as a main reinforcing agent. Each sidewall 10 can include the silica described above for the tread 4.

The rolling resistance of the tire 2 including the sidewalls 10 is low. The silica contributes to low fuel consumption performance of the tire 2. In light of low fuel consumption performance and strength of each sidewall 10, the amount of the silica per 100 parts by weight of the base rubber is preferably equal to or greater than 35 parts by weight and particularly preferably equal to or greater than 45 parts by weight. The amount is preferably equal or less than 100 parts by weight.

The rubber composition of each sidewall 10 may include a small amount of carbon black as another reinforcing agent. The carbon black contributes to strength of each sidewall. The small amount of the carbon black does not significantly impair low fuel consumption performance which is due to the silica. The amount of the carbon black per 100 parts by weight of the base rubber is preferably equal to or less than 20 parts by weight, more preferably equal to or less than 10 parts by weight, and particularly preferably equal to or less than 5 parts by weight.

The rubber composition of each sidewall 10 includes a silane coupling agent. The rubber composition further includes sulfur and a vulcanization accelerator. The rubber composition may include a softener, a plasticizer, an antioxidant, stearic acid, zinc oxide, and the like.

The clinches 12 are located substantially inward of the sidewalls 10 in the radial direction. The clinches 12 are located outward of the beads 14 and the carcass 16 in the axial direction. The clinches 12 are conductive. The clinches 12 abut against flanges 32 of a rim. The flanges 32 are formed from steel or an aluminum alloy. Therefore, the flanges 32 are conductive.

Each clinch 12 is formed by crosslinking a rubber composition. A preferable base rubber of the rubber composition is a diene rubber. The diene rubbers described above for the tread 4 can also be used for each clinch 12. In light of wear resistance, polymers which are particularly suitable for each clinch 12 are natural rubber and polybutadiene.

The rubber composition of each clinch 12 includes carbon black as a main reinforcing agent. The carbon black described above for the under tread 6 can also be used for each clinch 12.

The rubber composition of each clinch 12 includes sulfur and a vulcanization accelerator. The rubber composition may include a softener, a plasticizer, an antioxidant, stearic acid, zinc oxide, and the like.

The beads 14 are located inward of the clinches 12 in the axial direction. Each bead 14 includes a core 34 and an apex 36 extending from the core 34 outward in the radial direction. The core 34 has a ring shape and includes a wound non-stretchable wire. The material of the wire is typically steel. The apex 36 is tapered outward in the radial direction. The apex 36 is formed from a highly hard crosslinked rubber.

The carcass 16 is formed of a carcass ply 38. The carcass ply 38 extends on and between the beads 14 at both sides, and extends along the tread 4 and the sidewalls 10. The carcass ply 38 is turned up around each core 34 from the inner side to the outer side in the axial direction. Due to this turning-up, a main portion 40 and turned-up portions 42 are formed in the carcass ply 38. The turned-up portions 42 are laminated on the clinches 12. The carcass 16 may include two or more plies.

Figure 2:
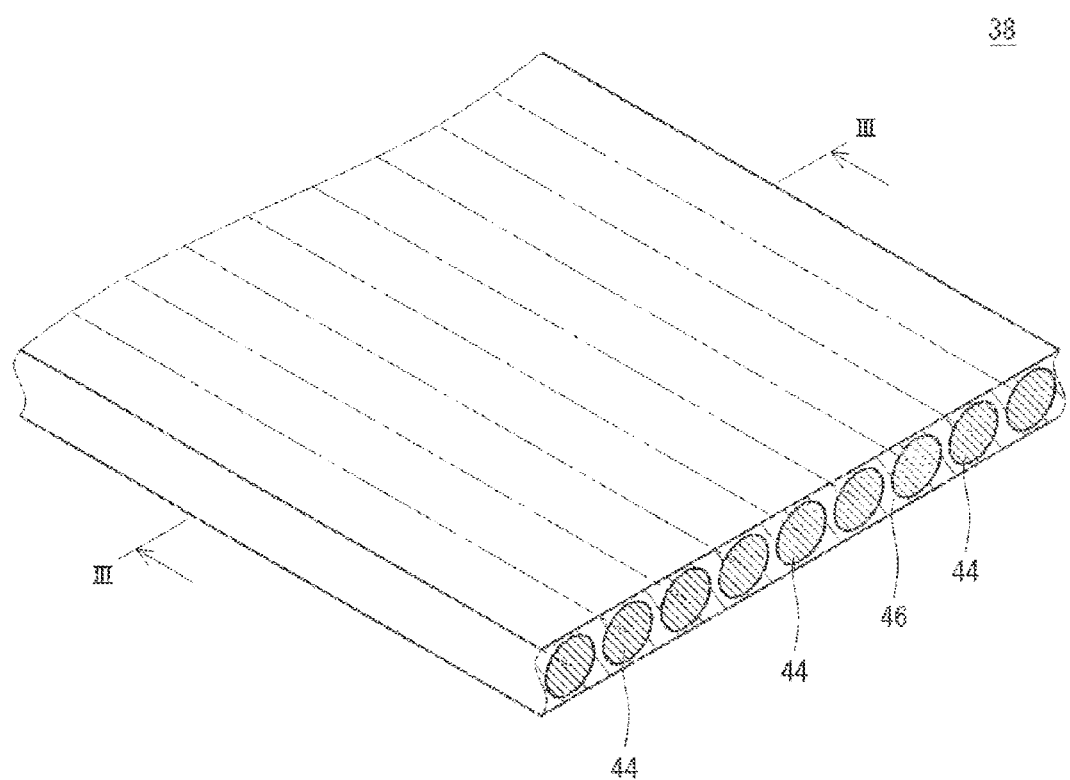
FIG. 2 is an enlarged perspective view showing a portion of a carcass of the tire in FIG. 1.

FIG. 2 shows a portion of the carcass ply 38. The carcass ply 38 includes a large number of cords 44 aligned with each other, and a topping rubber 46. The absolute value of the angle of each cord 44 relative to the equator plane is 75° to 90°. In other words, the carcass 16 has a radial structure. Each cord 44 is formed from an organic fiber. Examples of preferable organic fibers include polyester fibers, nylon fibers, rayon fibers, polyethylene naphthalate fibers, and aramid fibers.

The topping rubber 46 is conductive. The topping rubber 46 is formed by crosslinking a rubber composition. A preferable base rubber of the rubber composition is a diene rubber. The diene rubbers described above for the tread 4 can also be used for the topping rubber 46. A polymer which is particularly suitable for the topping rubber 46 is natural rubber.

The rubber composition of the topping rubber 46 includes carbon black as a main reinforcing agent. The rubber composition can include the carbon black described above for the under tread 6. The carbon black is a conductive substance. Since the rubber composition includes the carbon black as a main reinforcing agent, the topping rubber is achieved to be conductive. In light of conductivity, the amount of the carbon black per 100 parts by weight of the base rubber is preferably equal to or greater than 35 parts by weight and particularly preferably equal to or greater than 45 parts by weight. The amount is preferably equal to or less than 100 parts by weight.

The rubber composition of the topping rubber 46 includes sulfur and a vulcanization accelerator. The rubber composition may include a softener, a plasticizer, an antioxidant, stearic acid, zinc oxide, and the like.

Figure 3:
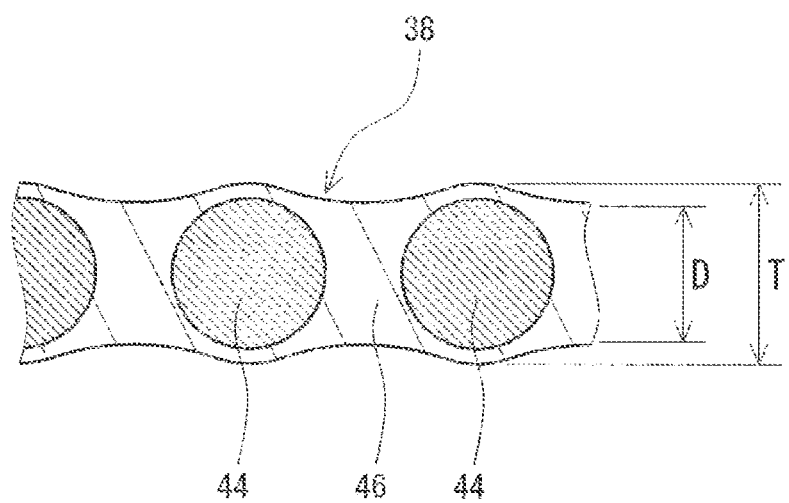
FIG. 3 is an enlarged cross-sectional view taken along a line in FIG. 2.

FIG. 3 is an enlarged cross-sectional view taken along a line in FIG. 2. In FIG. 3, an arrow D indicates the diameter of each carcass cord 44, and an arrow T indicates the thickness of the carcass ply 38. In the present specification, a difference (T−D) is referred to as a minimum thickness g of the topping rubber.

Each carcass cord 44 is non-conductive. Therefore, in order that the carcass 16 is conductive, the minimum thickness g of the topping rubber 46 needs to be sufficiently large. The minimum thickness g is preferably equal to or greater than 0.07 mm, more preferably equal to or greater than 0.08 mm, and particularly preferably equal to or greater than 0.09 mm.

The minimum thickness q is very small as compared to the thickness T of the carcass ply 38. Therefore, in order that the carcass 16 is conductive, the volume resistivity $\rho$ of the topping rubber 46 needs to be sufficiently low. The volume resistivity $\rho$ is preferably less than $1.0 \times 10^8 \Omega \cdot cm$, more preferably equal to or less than $1.0 \times 10^7 \Omega \cdot cm$, and particularly preferably equal to or less than $8.0 \times 10^6 \Omega \cdot cm$.

The belt 18 (reinforcing layer) is located inward of the under tread 6 in the radial direction. The belt 18 is laminated on the carcass 16. The belt 18 reinforces the carcass 16. The belt 18 includes an inner layer 48 and an outer side 50. As is obvious from FIG. 1, the width of the inner layer 48 is slightly larger than the width of the outer side 50 in the axial direction. Each of the inner layer 48 and the outer side 50 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 48 is tilted relative to the equator plane is opposite to the direction in which each cord of the outer side 50 is tilted relative to the equator plane. The material of the cords is preferably steel. Therefore, the cords are conductive. The width of the belt 18 in the axial direction is preferably equal to or greater than 0.7 times of the maximum width of the tire 2. The belt 18 may include three or more layers.

The topping rubber of the belt 18 is conductive. The topping rubber is formed by crosslinking a rubber composition. A preferable base rubber of the rubber composition is a diene rubber. The diene rubbers described above for the tread 4 can also be used for the topping rubber. A polymer which is particularly suitable for the topping rubber is natural rubber.

The rubber composition of the topping rubber includes carbon black as a main reinforcing agent. The rubber composition can include the carbon black described above for the under tread 6. The carbon black is a conductive substance. Since the rubber composition includes the carbon black as a main reinforcing agent, the topping rubber is achieved to be conductive. Since the cords and the topping rubber are conductive, the electric resistance of the belt 18 is very low.

The inner liner 20 is located inward of the carcass 16. Near the equator plane, the inner liner 20 is joined to the inner surface of the carcass 16. The inner liner 20 is formed by crosslinking a rubber composition. The rubber composition includes a base rubber that has an excellent air blocking property. The base rubber of the inner liner 20 is typically isobutylene-isoprene-rubber or halogenated isobutylene-isoprene-rubber. The inner liner 20 maintains the internal pressure of the tire 2.

The rubber composition of the inner liner 20 includes silica as a main reinforcing agent. The inner liner 20 can include the silica described above for the tread 4. The rolling resistance of the tire 2 including the inner liner 20 is low. The silica contributes to low fuel consumption performance of the tire 2. In light of low fuel consumption performance and strength of the inner liner 20, the amount of the silica per 100 parts by weight of the base rubber is preferably equal to or greater than 35 parts by weight and particularly preferably equal to or greater than 45 parts by weight. The amount is preferably equal to or less than 100 parts by weight.

The rubber composition of the inner liner 20 may include a small amount of carbon black as another reinforcing agent. The carbon black contributes to strength of the inner liner 20. The small amount of the carbon black does not significantly impair low fuel consumption performance which is due to the silica. The amount of the carbon black per 100 parts by weight of the base rubber is preferably equal to or less than 20 parts by weight, more preferably equal to or less than 10 parts by weight, and particularly preferably equal to or less than 5 parts by weight.

The rubber composition of the inner liner 20 includes a silane coupling agent. The rubber composition further includes sulfur and a vulcanization accelerator. The rubber composition may include a softener, a plasticizer, an antioxidant, stearic acid, zinc oxide, the like.

The rubber composition of the inner liner 20 may include carbon black as a main reinforcing agent.

The insulation 22 is interposed between the carcass 16 and the inner liner 20. The insulation 22 is firmly joined to the carcass 16 and is also firmly joined to the inner liner 20. The insulation 22 suppresses separation of the inner liner 20 from the carcass 16.

The insulation 22 is formed by crosslinking a rubber composition. A preferable base rubber of the rubber composition is a diene rubber. The diene rubbers described above for the tread 4 can also be used for the insulation 22. Polymers which are particularly suitable for the insulation 22 in light of adhesiveness to the carcass 16 and the inner liner 20 are natural rubber and emulsion-polymerized styrene-butadiene copolymer.

The rubber composition of the insulation 22 includes silica as a main reinforcing agent. The insulation 22 can include the silica described above for the tread 4. The rolling resistance of the tire 2 including the insulation 22 is low. The silica contributes to low fuel consumption performance of the tire 2. The amount of the silica per 100 parts by weight of the base rubber is preferably equal to or greater than 35 parts by weight and particularly preferably equal to or greater than 45 parts by weight. The amount is preferably equal to or less than 100 parts by weight.

The rubber composition of the insulation 22 may include a small amount of carbon black as another reinforcing agent. The carbon black contributes to strength of the insulation 22. The small amount of the carbon black does not significantly impair low fuel consumption performance which is due to the silica. The amount of the carbon black per 100 parts by weight of the base rubber is preferably equal to or less than 20 parts by weight, more preferably equal to or less than 10 parts by weight, and particularly preferably equal to or less than 5 parts by weight.

The rubber composition of the insulation 22 includes a silane coupling agent. The rubber composition further includes sulfur and a vulcanization accelerator. The rubber composition may include a softener, a plasticizer, an anti-oxidant, stearic acid, zinc oxide, and the like.

The rubber composition of the insulation 22 may include carbon black as a main reinforcing agent.

The chafers 24 are located near the beads 14. When the tire 2 is mounted on the rim, the chafers 24 abut against the rim. The abutment allows protection of the Vicinity of each bead 14. The chafers 24 are composed of a fabric and a crosslinked rubber with which the fabric is impregnated. The chafers 24 are non-conductive.

In the tire 2, static electricity is discharged via the flanges 32, the clinches 12, the carcass 16, the belt 18 (reinforcing layer), the under tread 6, and the penetration portions 8. The carcass 16 allows for electric conduction between the clinches 12 and the belt 18. The electric resistance Rc of the carcass 16 between the clinches 12 and the belt 18 is low, whereby the tire 2 is achieved to be conductive. The electric resistance Rc of the carcass 16 which is represented by the following mathematical formula is preferably less than $1.0 \times 10^8 \Omega$.

$$Rc = \rho/g/(2 \times 3.14 \times r) \times L \times 10$$

In the mathematical formula, $\rho$ is the volume resistivity ($\Omega \cdot cm$) of the topping rubber 46 of the carcass 16, g is the minimum thickness (mm) of the topping rubber 46, r is the distance (m) from the axis of the tire 2 to an outer end 52, in the radial direction, of the clinch 12, and L is the length (m) of the carcass 16 from an end 54 of the reinforcing layer to the outer end 52, in the radial direction, of the clinch 12. In the mathematical formula, $(2 \times 3.14 \times r)$ is the circumferential length of the outer end 52, in the radial direction, of the clinch 12. The electric resistance Rc is more preferably equal to or less than $8.8 \times 10^7 \Omega$ and particularly preferably equal to or less than $7.1 \times 10^7 \Omega$.

In RIG. 1, an arrow L1 indicates a length by which the clinch 12 and the carcass 16 are in contact with each other. In light of conductivity, the length L1 is preferably equal to or greater than 5 mm and particularly preferably equal to or greater than 10 mm.

In FIG. 1, an arrow L2 indicates a length by which the carcass 16 and the belt 18 are in contact with each other. In light of conductivity, the length L2 is preferably equal to or greater than 5 mm and particularly preferably equal to or greater than 10 mm.

In FIG. 1, an arrow L3 indicates a length by which the belt 18 and the under tread 6 are in contact with each other. In light of conductivity, the length L3 is preferably equal to or greater than 5 mm and particularly preferably equal to or greater than 10 mm.

In FIG. 1, a width W indicates the width of an exposed surface of the penetration portion 8. From the standpoint that electricity is sufficiently discharged, the width W is preferably equal to or greater than 3 mm and particularly preferably equal to or greater than 5 mm.

Figure 4:
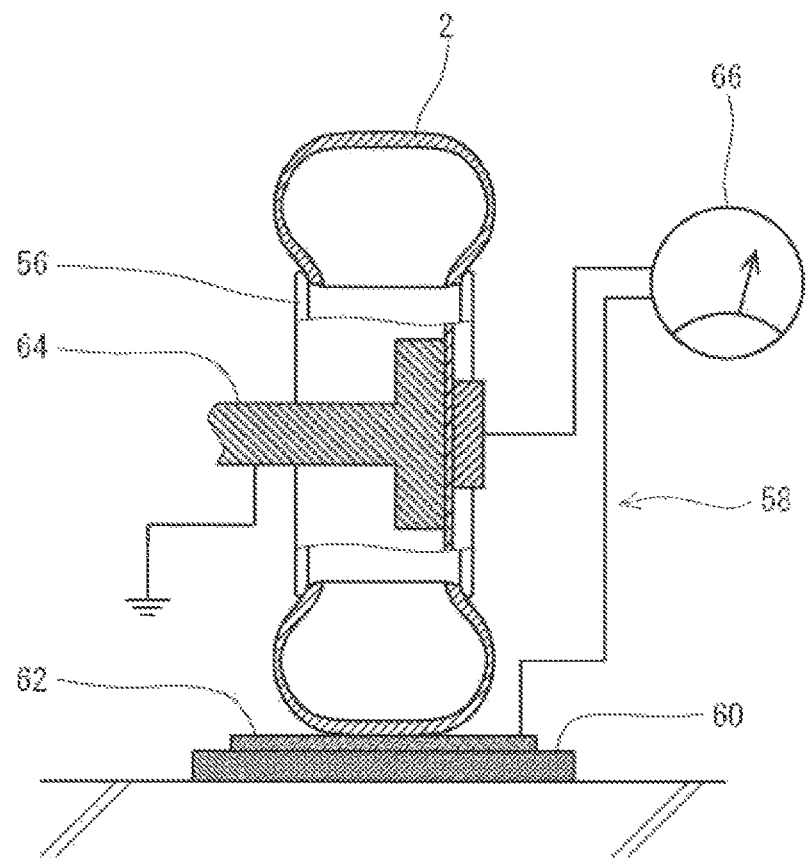
FIG. 4 is a schematic diagram showing the tire in FIG. 1 together with a rim and an electric resistance measuring device.

FIG. 4 shows a rim 56 and an electric resistance measuring device 58 together with the tire 2. The device 58 includes an insulating plate 60, a metal plate 62, a shaft 64, and an ohmmeter 66. The electric resistance of the insulating plate 60 is equal to or greater than $1.0 \times 10^{12} \Omega$. The surface of the metal plate 62 is polished. The electric resistance of the metal plate 62 is equal to or less than $10 \Omega$. The electric resistance Rt of the tire 2 is measured according to the JATMA standard using the device 58. Before the measurement, dirt and a lubricant on the surface of the tire 2 are removed. The tire 2 is sufficiently dried. The tire 2 is mounted onto the rim 56 which is made of an aluminum alloy. When mounting, soapy water is applied as a lubricant, to a portion where the tire 2 and the rim 56 are in contact with each other. The tire 2 is inflated such that the internal pressure thereof becomes 200 kPa. The tire 2 and the rim 56 are kept in a test room for 2 hours. The temperature of the test room is 25° C., and the humidity of the test room is 50%. The tire 2 and the rim 58 are mounted onto the shaft 64. A load of 5.3 kN is applied to the tire 2 and the rim 56 for 0.5 minute, and then the load is released. A load of 5.3 kN is applied to the tire 2 and the rim 56 for 0.5 minute again, and then the load is released. Furthermore, a load of 5.3 kN is applied to the tire 2 and the rim 56 for 2.0 minutes, and then the load is released. Thereafter, a voltage of 1000 V is applied between the shaft 64 and the metal plate 62. After 5 minutes elapses from the start of the application, an electric resistance between the shaft 64 and the metal plate 62 is measured with the ohmmeter 66. The measurement is conducted at four points spaced apart from each other along the circumferential direction of the tire 2 at intervals of 90°. The maximum value of the obtained four electric resistances is the electric resistance Rt of the tire 2.

The electric resistance Rt is preferably less than $1.0 \times 10^8 \Omega$. The tire 2 having an electric resistance Rt of less than $1.0 \times 10^8 \Omega$ is less likely to be charged with static electricity. In this respect, the electric resistance Rt is more preferably equal to or less than $8.8 \times 10^7 \Omega$ and particularly preferably equal to or less than $7.1 \times 10^7 \Omega$.

In the present invention, the dimensions and angles of each component of the tire are measured in a state where the tire is mounted on a normal rim and inflated to a normal internal pressure. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire for passenger car, the dimensions and angles are measured in a state where the internal pressure is 180 kPa.

Figure 5:
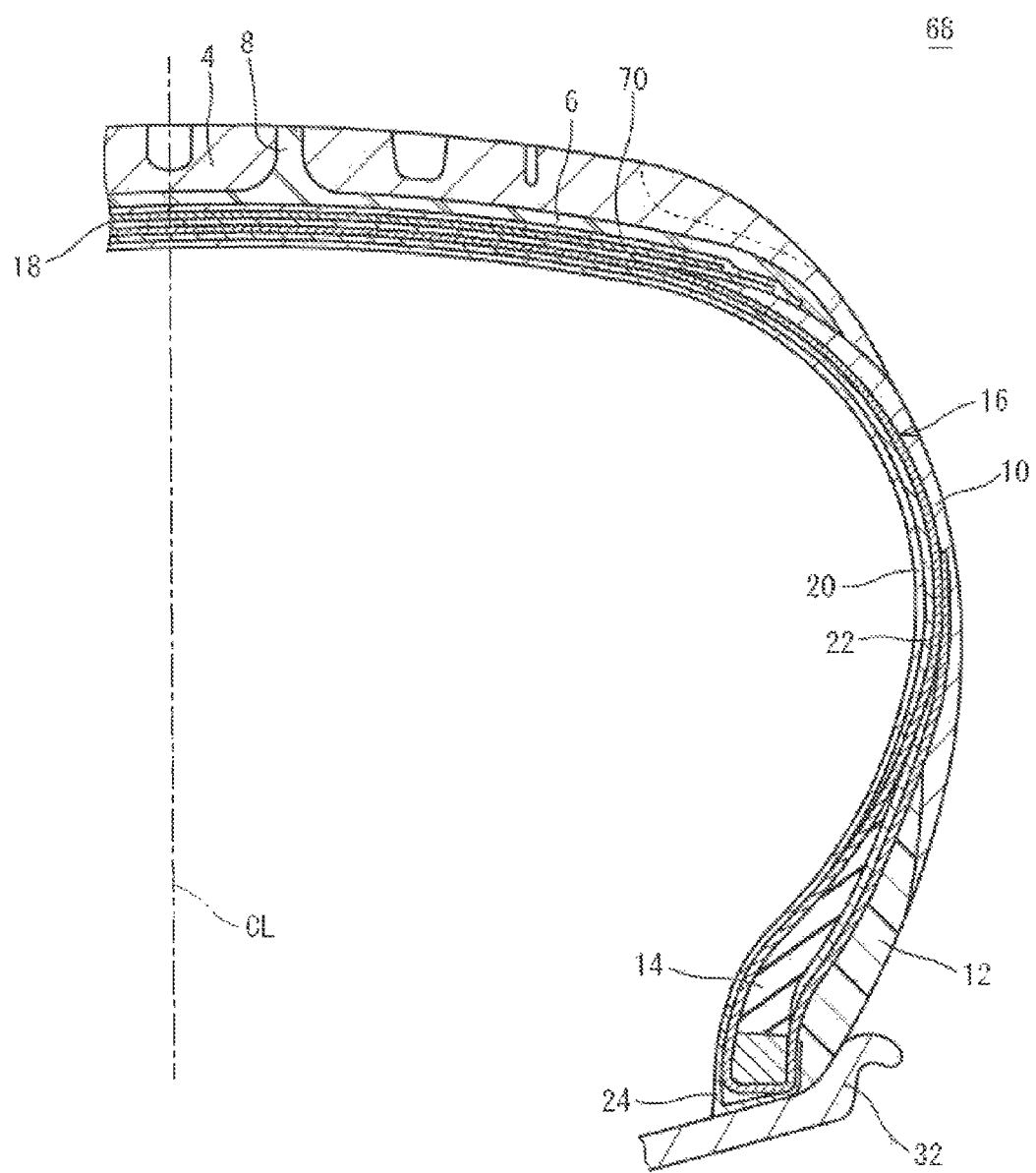
FIG. 5 is a cross-sectional view showing a portion of a pneumatic tire according to another embodiment of the present invention.

FIG. 5 is a cross-sectional view showing a portion of a pneumatic tire 68 according to another embodiment of the present invention. The tire 68 includes a tread 4, an under tread 6, penetration portions 8, sidewalls 10, clinches 12, beads 14, a carcass 16, a belt 18, a band 70, an inner liner 20, an insulation 22, and chafers 24. Whereas the tire 2 shown in FIG. 1 includes the reinforcing layer including only the belt 18, the tire 68 shown in FIG. 5 includes a reinforcing layer including the belt 18 and the band 70. The configurations of the components of the tire 68 other than the band 70 are the same as those of the tire 2 shown in FIG. 1.

The band 70 is located inward of the under tread 6 in the radial direction. The band 70 is laminated on the belt 18. The band 70 includes a large number of cords aligned with each other, and a topping rubber, which are not shown. The cords are helically wound. The hand 70 has a so-called jointless structure. The cords extend in substantially the circumferential direction. The angle of each cord relative to the circumferential direction is equal to or less than 5° and further equal to or less than 2°. The belt 18 is secured by the cords, so that lifting of the belt 18 is suppressed. Each cord is formed from an organic fiber. Examples of preferable organic fibers include nylon fibers, polyester fibers, rayon fibers, polyethylene naphthalate fibers, and aramid fibers.

The topping rubber of the band 70 is conductive. The topping rubber is formed by crosslinking a rubber composition. A preferable base rubber of the rubber composition is a diene rubber. The diene rubbers described above for the tread 4 of the tire 2 shown in FIG. 1 can also be used for the topping rubber.

The rubber composition of the topping rubber includes carbon black as a main reinforcing agent. The rubber composition can include the carbon black described above for the under tread 6 of the tire 2 shown in FIG. 1. The carbon black is a conductive substance. Since the rubber composition includes the carbon black as a main reinforcing agent, the band 70 is achieved to be conductive.

In the tire 68, static electricity is discharged via the flanges 32, the clinches 12, the carcass 16, the belt 18, the band 70, the under tread 6, and the penetration portions 8.

EXAMPLES

The following will show effects of the present invention by means of examples, but the present invention should not be construed in a limited manner based on the description of these examples.

Example 1

A tire having the structure shown in FIG. 1 was produced. The size of the tire was "195/65R15". Rubber compositions used for the components of the tire are shown in Table 5 below. These rubber compositions are shown in detail in Tables 1 to 4 below. In preparation of each rubber composition, first, a base rubber and chemicals other than sulfur and a vulcanization accelerator are mixed with a banbury mixer. While the mixture obtained by the mixing is further mixed with a twin-screw open roll, the sulfur and the vulcanization accelerator are added thereto. By the mixing, a rubber composition is obtained. The components formed from these rubber compositions are laminated together in a preforming process to obtain a raw cover. The raw cover is put into a mold and heated at a temperature of 170° C. for 15 minutes to obtain a tire.

Examples 2 to 8 and Comparative Examples 1 to 4

Tires of Examples 2 to 8 and Comparative Examples 1 to 4 were obtained in the same manner as Example 1, except rubber compositions shown in Tables 5 to 7 below were used.

TABLE 1

| Rubber Composition | Tread | | Sidewall | |
|---|---|---|---|---|
| | A | B | C | D |
| NR | | | 60 | 60 |
| S-SBR | 100 | 100 | | |
| E-SBR | | | | |
| Brominated isobutylene-isoprene-rubber | | | | |

TABLE 1-continued

| Rubber Composition | Tread | | Sidewall | |
|---|---|---|---|---|
| | A | B | C | D |
| BR | | | 40 | 40 |
| Carbon Black N220 | 5 | 65 | 5 | 50 |
| Carbon Black N330 | | | | |
| Carbon Black N550 | | | | |
| Carbon Black N660 | | | | |
| Bituminous coal | | | | |
| Silica | 60 | | 45 | |
| Silane coupling agent | 6 | | 4.5 | |
| Wax | 2 | 2 | 2 | 2 |
| Antioxidant | 2 | 2 | 2.5 | 2.5 |
| Oil | 10 | 10 | | |
| Stearic acid | 2 | 2 | 2 | 2 |
| Zinc oxide | 3 | 3 | 4 | 4 |
| Sulfur | 2.2 | 2.2 | 2 | 2 |
| Accelerator CZ | 1 | 1 | 1 | 1 |
| Accelerator D | 0.5 | | 0.5 | |
| Volume resistivity ($\Omega \cdot cm$) | $2.5 \times 10^{14}$ | $8.0 \times 10^{6}$ | $2.5 \times 10^{14}$ | $8.0 \times 10^{6}$ |

TABLE 2

| Rubber Composition | Belt | Insulation | | |
|---|---|---|---|---|
| | E | F | G | H |
| NR | 100 | 70 | 70 | 70 |
| S-SBR | | | | |
| E-SBR | | 30 | 30 | 30 |
| Brominated isobutylene-isoprene-rubber | | | | |
| BR | | | | |
| Carbon Black N220 | 55 | 5 | | |
| Carbon Black N330 | | | | |
| Carbon Black N550 | | | | 50 |
| Carbon Black N660 | | | 40 | |
| Bituminous coal | | | 10 | |
| Silica | | 45 | | |
| Silane coupling agent | | 4.5 | | |
| Wax | | 2 | 2 | 2 |
| Antioxidant | 2 | 2.5 | 2.5 | 2.5 |
| Oil | 2 | | | |
| Stearic acid | 1 | 2 | 2 | 2 |
| Zinc oxide | 10 | 4 | 4 | 4 |
| Sulfur | 6.9 | 2 | 2 | 2 |
| Accelerator CZ | 1 | 1 | 1 | 1 |
| Accelerator D | | 0.5 | | |
| Volume resistivity ($\Omega \cdot cm$) | $8.0 \times 10^{6}$ | $2.5 \times 10^{14}$ | $2.5 \times 10^{14}$ | $2.5 \times 10^{7}$ |

TABLE 3

| Rubber Composition | Inner liner | | | Clinch |
|---|---|---|---|---|
| | I | J | K | L |
| NR | 5 | 5 | 5 | 60 |
| S-SBR | | | | |
| E-SBR | | | | |
| Brominated isobutylene-isoprene-rubber | 95 | 95 | 95 | |
| BR | | | | 40 |

TABLE 3-continued

Rubber Composition

| | Inner liner | | | Clinch |
|---|---|---|---|---|
| | I | J | K | L |
| Carbon Black N220 | 5 | | | 70 |
| Carbon Black N330 | | | | |
| Carbon Black N550 | | | 50 | |
| Carbon Black N660 | | 40 | | |
| Bituminous coal | | 10 | | |
| Silica | 45 | | | |
| Silane coupling agent | 4.5 | | | |
| Wax | | | | 2 |
| Antioxidant | 1 | 1 | 1 | 2.5 |
| Oil | 15 | 15 | 15 | |
| Stearic acid | 2 | 2 | 2 | 2 |
| Zinc oxide | 5 | 5 | 5 | 4 |
| Sulfur | 0.5 | 0.5 | 0.5 | 3 |
| Accelerator CZ | 1.25 | 1.25 | 1.25 | 3 |
| Accelerator D | 0.2 | | | |
| Volume resistivity ($\Omega \cdot cm$) | $2.5 \times 10^{14}$ | $2.5 \times 10^{14}$ | $2.5 \times 10^{7}$ | $8.0 \times 10^{6}$ |

TABLE 4

Rubber Composition

| | Carcass | | | Penetration portion |
|---|---|---|---|---|
| | M | N | O | P |
| NR | 100 | 100 | 100 | |
| S-SBR | | | | 100 |
| E-SBR | | | | |
| Brominated isobutylene-isoprene-rubber | | | | |
| BR | | | | |
| Carbon Black N220 | | | 45 | 65 |
| Carbon Black N330 | | 45 | | |
| Carbon Black N550 | 45 | | | |
| Carbon Black N660 | | | | |
| Bituminous coal | | | | |
| Silica | | | | |
| Silane coupling agent | | | | |
| Wax | | | | 2 |
| Antioxidant | 2 | 2 | 2 | 2 |
| Oil | 2 | 2 | 2 | 10 |
| Stearic acid | 2 | 2 | 2 | 2 |
| Zinc oxide | 6 | 6 | 6 | 3 |
| Sulfur | 3.75 | 3.75 | 3.75 | 2.2 |
| Accelerator CZ | 1.5 | 1.5 | 1.5 | 1 |
| Accelerator D | | | | |
| Volume resistivity ($\Omega \cdot cm$) | $2.5 \times 10^{7}$ | $1.0 \times 10^{7}$ | $8.0 \times 10^{6}$ | $8.0 \times 10^{6}$ |

The details of the base rubbers and the chemicals of the rubber compositions are as follows.

NR: RSS#3
S-SBR: Trade name "E10" manufactured by Asahi Kasai Corporation
   Terminal group: amino acid
   Modification rate: 51% by weight
   Styrene content: 39% by weight
   Amount of vinyl bonds: 31% by weight
   Mw/Mn: 2.1
E-SBR: Trade name "SBR1502" manufactured by JSR Corporation
   Styrene content: 23.5% by weight
Brominated isobutylene-isoprene-rubber: Trade name "BROMOBUTYL 2255" manufactured by Japan Butyl Co., Ltd.
BR: Trade name "UBEPOL BR150B" manufactured by Ube Industries, Ltd.
Carbon Black N220: Trade name "N220" manufactured by Mitsubishi Chemical Corporation
Carbon Black N330: Trade name "N330" manufactured by Mitsubishi Chemical Corporation
Carbon Black N550: Trade name "N550" manufactured by Mitsubishi Chemical Corporation
Carbon Black N660: Trade name "N660" manufactured by Mitsubishi Chemical Corporation
Bituminous coal: Trade name "Austin Black 325" manufactured by Coal Fillers, Inc.
Silica: Trade name "Ultrasil VN3" manufactured by Degussa Co., Ltd.
   Nitrogen adsorption specific surface area: 175 $m^2/g$
Silane coupling agent: Trade name "Si69" manufactured by Degussa Co., Ltd.
   Bis(3-triethoxysilylpropyl)tetrasulfide
Wax: Trade name "Sunnoc N" manufactured by Ouchi Shinko Chemical Industrial Co., Ltd.
Antioxidant: Trade name "Nocrac 6C" manufactured by Ouchi Shinko Chemical Industrial Co., Ltd.
   N-1,3-dimethylbutyl-N'-phenyl-p-phenylenediamine
Oil: Trade name "JOMO Process X140" manufactured by Japan Energy Corporation
Stearic acid: NOF Corporation
Zinc oxide: Trade name "Zinc Oxide No. 1" manufactured by Mitsui Mining & Smelting Co., Ltd.
Sulfur: Powdered sulfur manufactured by Tsurumi Chemical Industry Co., Ltd.
Vulcanization accelerator CZ: Trade name "Nocceler CZ" manufactured by Ouchi Shinko Chemical Industrial Co., Ltd.
Vulcanization accelerator D: Trade name "Nocceler D" manufactured by Ouchi Shinko Chemical Industrial Co., Ltd.

[Rolling Resistance]

A rolling resistance was measured using a rolling resistance tester under the following conditions.

Used rim: 15×6J
Internal pressure: 200 kPa
Load: 6.96 kN
Speed: 80 km/h

The results are shown in Tables 5 to 7 below as indexes which are based on Comparative Example 1. A lower value indicates a better result.

[Electric Resistance]

The electric resistance Rt of each tire was measured by the method shown in FIG. 4. The results are shown in Tables 5 to 7 below.

TABLE 5

Results of Evaluation

| | Example 1 | Example 2 | Example 3 | Example 4 |
|---|---|---|---|---|
| Tread | A | A | A | A |
| Sidewall | C | C | C | C |
| Belt | E | E | E | E |
| Insulation | F | F | F | G |
| Inner liner | I | I | I | I |

TABLE 5-continued

Results of Evaluation

|  | Example 1 | Example 2 | Example 3 | Example 4 |
|---|---|---|---|---|
| Clinch |  |  |  |  |
| Composition | L | L | L | L |
| Circumferential length (m) | 3.14 | 3.14 | 3.14 | 3.14 |
| Penetration portion | P | P | P | P |
| Carcass |  |  |  |  |
| Composition | N | N | O | O |
| $\rho$ ($\Omega \cdot$ cm) | $1.0 \times 10^7$ | $1.0 \times 10^7$ | $8.0 \times 10^6$ | $8.0 \times 10^6$ |
| Thickness T (mm) | 1.0 | 1.2 | 1.0 | 1.0 |
| Minimum thickness g (mm) | 0.0722 | 0.0922 | 0.0722 | 0.0722 |
| L (m) | 0.2 | 0.2 | 0.2 | 0.2 |
| Electric resistance RC ($\Omega$) | $8.8 \times 10^7$ | $6.9 \times 10^7$ | $7.1 \times 10^7$ | $7.1 \times 10^7$ |
| Rolling resistance (index) | 80 | 81 | 81 | 81 |
| Electric resistance Rt ($\Omega$) | $8.8 \times 10^7$ | $6.9 \times 10^7$ | $7.1 \times 10^7$ | $7.1 \times 10^7$ |

TABLE 6

Results of Evaluation

|  | Example 5 | Example 6 | Example 7 | Example 8 |
|---|---|---|---|---|
| Tread | A | A | A | A |
| Sidewall | C | C | C | C |
| Belt | E | E | E | E |
| Insulation | F | H | H | F |
| Inner liner | J | K | I | K |
| Clinch |  |  |  |  |
| Composition | L | L | L | L |
| Circumferential length (m) | 3.14 | 3.14 | 3.14 | 3.14 |
| Penetration portion | P | P | P | P |
| Carcass |  |  |  |  |
| Composition | O | O | O | O |
| $\rho$ ($\Omega \cdot$ cm) | $8.0 \times 10^6$ | $1.0 \times 10^7$ | $1.0 \times 10^7$ | $1.0 \times 10^7$ |
| Thickness T (mm) | 1.0 | 1.4 | 1.4 | 1.4 |
| Minimum thickness g (mm) | 0.0722 | 0.1122 | 0.1122 | 0.1122 |
| L (m) | 0.2 | 0.2 | 0.2 | 0.2 |
| Electric resistance RC ($\Omega$) | $7.1 \times 10^7$ | $5.7 \times 10^7$ | $5.7 \times 10^7$ | $5.7 \times 10^7$ |
| Rolling resistance (index) | 81 | 85 | 83 | 81 |
| Electric resistance Rt ($\Omega$) | $7.1 \times 10^7$ | $2.5 \times 10^7$ | $2.9 \times 10^7$ | $7.1 \times 10^7$ |

TABLE 7

Results of Evaluation

|  | Comp. Example 1 | Comp. Example 2 | Comp. Example 3 | Comp. Example 4 |
|---|---|---|---|---|
| Tread | B | A | A | A |
| Sidewall | D | C | C | D |
| Belt | E | E | E | E |
| Insulation | H | F | F | H |
| Inner liner | K | I | I | K |
| Clinch |  |  |  |  |
| Composition | L | L | L | L |
| Circumferential length (m) | 3.14 | 3.14 | 3.14 | 3.14 |
| Penetration portion | — | P | P | — |

TABLE 7-continued

Results of Evaluation

|  | Comp. Example 1 | Comp. Example 2 | Comp. Example 3 | Comp. Example 4 |
|---|---|---|---|---|
| Carcass |  |  |  |  |
| Composition | N | N | M | N |
| $\rho$ ($\Omega \cdot$ cm) | $1.0 \times 10^7$ | $1.0 \times 10^7$ | $2.5 \times 10^7$ | $1.0 \times 10^7$ |
| Thickness T (mm) | 1.4 | 0.8 | 1.4 | 1.4 |
| Minimum thickness g (mm) | 0.1122 | 0.0522 | 0.1122 | 0.1122 |
| L (m) | 0.2 | 0.2 | 0.2 | 0.2 |
| Electric resistance RC ($\Omega$) | $5.7 \times 10^7$ | $1.2 \times 10^8$ | $1.4 \times 10^8$ | $5.7 \times 10^7$ |
| Rolling resistance (index) | 100 | 79 | 80 | 95 |
| Electric resistance Rt ($\Omega$) | $1.0 \times 10^6$ | $1.2 \times 10^8$ | $1.4 \times 10^8$ | $1.0 \times 10^6$ |

INDUSTRIAL APPLICABILITY

The pneumatic tire according to the present invention can be mounted on various vehicles.

DESCRIPTION OF THE REFERENCE CHARACTERS

2, 68 . . . pneumatic tire
4 . . . tread
6 . . . under tread
8 . . . penetration portion
10 . . . sidewall
12 . . . clinch
14 . . . bead
16 . . . carcass
18 . . . belt
20 . . . inner liner
22 . . . insulation
24 . . . chafer
32 . . . flange
38 . . . carcass ply
44 . . . carcass cord
46 . . . topping rubber
70 . . . band

The invention claimed is:
1. A pneumatic tire comprising:
a non-conductive tread having an outer surface which forms a tread surface;
a conductive under tread located inward of the tread in a radial direction;
a conductive penetration portion penetrating through the tread, exposed at an end thereof on the tread surface, and extending at another end thereof to the under tread;
a pair of non-conductive sidewalls extending from ends, respectively, of the tread substantially inward in the radial direction;
a pair of conductive clinches extending from ends of the sidewalls, respectively, substantially inward in the radial direction;
a pair of beads located inward of the clinches, respectively, in an axial direction;
a carcass extending along and inward of the tread and the sidewalls and on and between one of the beads and the other bead;
a conductive reinforcing layer laminated on the carcass at an inner side, in the radial direction, of the under tread;

an inner liner located inward of the carcass; and
an insulation located between the carcass and the inner liner,
wherein
the carcass includes a plurality of cords aligned with each other, and a conductive topping rubber, and
an electric resistance Rc of the carcass which is represented by the following mathematical formula is less than $1.0 \times 10^8 \Omega$, $$Rc = \rho/g/(2 \times 3.14 \times r) \times L \times 10$$

(in the mathematical formula, $\rho$ is a volume resistivity ($\Omega \cdot cm$) of the topping rubber of the carcass, g is a minimum thickness (mm) of the topping rubber, r is a distance (m) from an axis of the tire to an outer end, in the radial direction, of the clinch, and L is a length (m) of the carcass from an end of the reinforcing layer to the outer end, in the radial direction, of the clinch),
wherein
the inner liner is formed by crosslinking a rubber composition, and
the rubber composition includes 100 parts by weight of a base rubber and 35 parts by weight or greater of silica, and
wherein
the insulation is formed by crosslinking a rubber composition, and
the rubber composition includes 100 parts by weight of a base rubber and 35 parts by weight or greater of silica.

2. The tire according to claim 1, wherein an electric resistance Rt of the tire is less than $1.0 \times 10^8 \Omega$, wherein the electric resistance Rt is measured by;
mounting the pneumatic tire onto a rim which is made of an aluminum alloy;
inflating the pneumatic tire to an internal pressure of 200 kPa, wherein the pneumatic tire and the rim 56 are kept in a test room for 2 hours, the temperature of the test room is 25° C., and the humidity of the test room is 50%;
mounting the pneumatic tire and the rim onto a shaft;
applying a load of 5.3 kN to the pneumatic tire and the rim for a half minute, and then releasing the load;
again applying a load of 5.3 kN to the pneumatic tire and the rim for a half minute, and then releasing the load;
applying a load of 5.3 kN to the pneumatic tire and the rim for 2.0 minutes, and then releasing the load;
applying a voltage of 1000 V between the shaft and a metal plate;
after applying the voltage for 5 minutes, measuring an electric resistance between the shaft and the metal plate with an ohmmeter, wherein the measurement is conducted at four points spaced apart from each other along the circumferential direction of the pneumatic tire at intervals of 90°; and
obtaining the maximum value of the four electric resistances measured at the four points as the electric resistance Rt of the pneumatic tire.

3. The tire according to claim 1, wherein the minimum thickness g of the topping rubber of the carcass is equal to or greater than 0.07 mm.

4. The tire according to claim 1, wherein
the topping rubber of the carcass is formed by crosslinking a rubber composition, and
the rubber composition includes 100 parts by weight of a base rubber and 35 parts by weight or greater of carbon black.

5. The tire according to claim 4, wherein the volume resistivity of the topping rubber of the carcass is less than $1.0 \times 10^8 \Omega \cdot cm$.

6. The tire according to claim 1, wherein
each sidewall is formed by crosslinking a rubber composition, and
the rubber composition includes 100 parts by weight of a base rubber and 35 parts by weight or greater of silica.

7. The tire according to claim 6, wherein
the rubber composition of the sidewall includes 100 parts by weight of a base rubber and 20 parts by weight or less of carbon black.

* * * * *